(12) United States Patent
Vanderzyden

(10) Patent No.: US 8,049,386 B2
(45) Date of Patent: Nov. 1, 2011

(54) SEAL CARTRIDGE

(75) Inventor: Henry R. Vanderzyden, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 267 days.

(21) Appl. No.: 12/437,588

(22) Filed: May 8, 2009

(65) Prior Publication Data
US 2010/0283209 A1 Nov. 11, 2010

(51) Int. Cl.
H02K 5/16 (2006.01)
(52) U.S. Cl. .............................. 310/90; 310/88
(58) Field of Classification Search .............. 310/89–90; 277/377
See application file for complete search history.

(56) References Cited

U.S. PATENT DOCUMENTS

| | | | | |
|---|---|---|---|---|
| 2,462,172 | A | * | 2/1949 | Esarey .............................. 310/90 |
| 2,779,883 | A | * | 1/1957 | Schumann ....................... 310/50 |
| 2,846,245 | A | | 8/1958 | Weaver |
| 3,094,638 | A | * | 6/1963 | Humpal et al. ............. 310/75 D |
| 3,119,942 | A | * | 1/1964 | Luther ........................... 173/171 |
| 3,853,432 | A | | 12/1974 | Cronstedt |
| 4,423,878 | A | * | 1/1984 | Escue ............................ 277/306 |
| 5,003,767 | A | | 4/1991 | Rodgers |
| 5,039,115 | A | | 8/1991 | Hebert et al. |
| 5,370,401 | A | * | 12/1994 | Sandgren ....................... 277/306 |
| 5,538,258 | A | | 7/1996 | Hager et al. |
| 5,558,341 | A | * | 9/1996 | McNickle et al. ............. 277/400 |
| 5,636,848 | A | | 6/1997 | Hager et al. |
| 5,727,793 | A | * | 3/1998 | Gosselin ........................ 277/308 |
| 6,059,085 | A | | 5/2000 | Farnsworth |
| 6,558,114 | B1 | | 5/2003 | Tapley et al. |
| 6,585,483 | B2 | | 7/2003 | Feest |
| 6,629,816 | B2 | | 10/2003 | Langston et al. |
| 6,681,579 | B2 | | 1/2004 | Lane et al. |
| 6,682,016 | B1 | | 1/2004 | Peroulakis |
| 6,769,432 | B1 | | 8/2004 | Keifer |
| 6,836,086 | B1 | | 12/2004 | Goldberg et al. |
| 7,080,591 | B2 | | 7/2006 | Doherty |
| 7,186,081 | B2 | | 3/2007 | Giesler et al. |
| 7,402,020 | B2 | | 7/2008 | Beers et al. |
| 2009/0289420 | A1 | * | 11/2009 | Freal et al. .................... 277/422 |

FOREIGN PATENT DOCUMENTS
DE 3839843 5/1990
* cited by examiner

Primary Examiner — Thanh Lam
(74) Attorney, Agent, or Firm — Carlson Gaskey & Olds PC

(57) ABSTRACT

A seal cartridge for a generator includes a housing which defines an annular cavity. An axial load spring and a seal ring within the annular cavity such that the seal ring is biased by the axial load spring.

21 Claims, 6 Drawing Sheets

US 8,049,386 B2

SEAL CARTRIDGE

BACKGROUND

The present disclosure relates to a seal, and more particularly to a seal cartridge for a starter-generator.

Aircraft powered by gas turbine engines often include a mechanically driven accessory gearbox which connects to accessory systems such as an electrical starter-generator. A seal cartridge is typically located within the starter-generator to provide a rotational seal for a shaft arrangement which interconnects the accessory gearbox and the starter-generator.

Although effective during normal operation, the seal cartridge must survive an aircrew initiated mechanical decouple of the starter-generator from the accessory gearbox. Such an aircrew initiated mechanical decouple may be performed in response to, for example, a starter-generator failure which may otherwise operate as a drag upon the accessory gearbox and the engine.

SUMMARY

A seal cartridge for a generator according to an exemplary aspect of the present disclosure includes a housing which defines an annular cavity. An axial load spring and a seal ring within the annular cavity such that the seal ring is biased by the axial load spring.

A seal kit for a seal cartridge having a housing which defines an annular cavity according to an exemplary aspect of the present disclosure includes: an axial load spring which is insertable within the annular cavity, a seal ring which is insertable within the annular cavity such that said seal ring is biased by said axial load spring and a retaining ring mountable adjacent to the annular cavity such that the seal ring is retainable within the annular cavity against the bias of the axial load spring.

A generator according to an exemplary aspect of the present disclosure includes a main rotor which defines an axis of rotation. An input shaft extends from the main rotor along the axis of rotation. A disconnect clutch is selectively operable to axially separate a first shaft portion from a second shaft portion of the input shaft along the axis of rotation, the first shaft portion defines a shaft flange. A seal cartridge includes a housing which defines an annular cavity. An axial load spring and a seal ring within the annular cavity such that the seal ring is biased by the axial load spring such that the seal ring is biased by the axial load spring into contact with the shaft flange.

A method of installing an input shaft for a generator according to an exemplary aspect of the present disclosure includes mounting a seal cartridge to a generator such that the seal ring within an annular cavity of the seal cartridge is biased into contact with a shaft flange of an input shaft to the generator.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
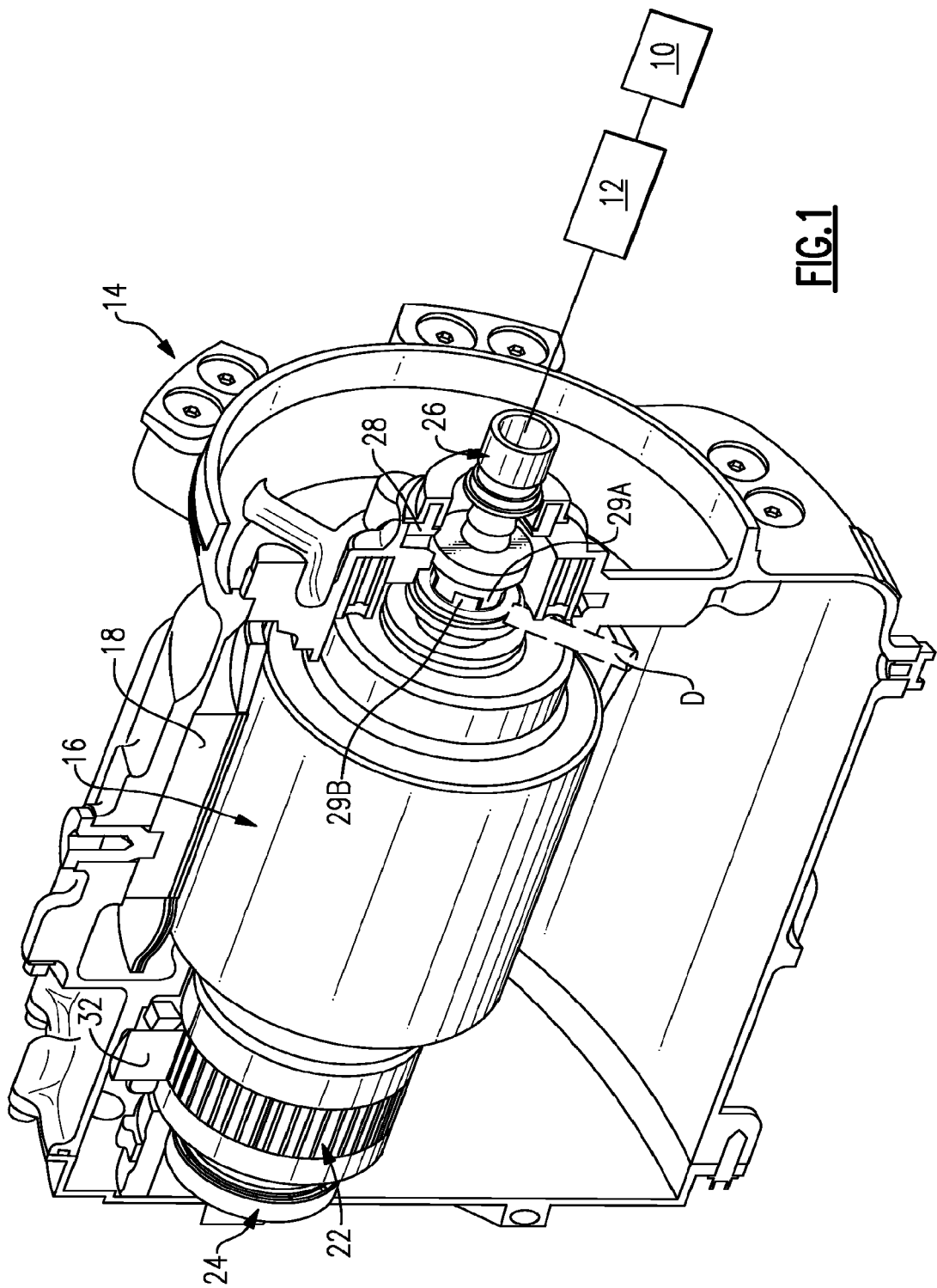
FIG. 1 is a general isometric sectional view of a starter-generator for a gas turbine engine.

FIG. 1 schematically illustrates a turbine engine 10 such as a gas turbine engine for propulsion. While a turbine engine for propulsion is contemplated in the disclosed non-limiting embodiment, it should be understood that the disclosure is applicable to other turbine engine configurations, including, for example, gas turbines for power generation, turbojet engines, low bypass turbofan engines, turboshaft engines, etc.

The gas turbine engine 10 supports an accessory gearbox 12 to which is mounted a generator 14 for starting the turbine engine 10 or generating electrical current when driven by the turbine engine 10. The generator 14 may be, for example, a variable frequency generator (VFG) or variable frequency starter generator (VFSG) that includes a main rotor assembly 16 that rotates adjacent to a main stator winding 18. As the main rotor assembly 16 rotates, a voltage is generated in the main stator winding 18. The generator 14 may alternatively or additionally include other systems such as an exciter system 22 and a DC system 24 on a common shaft 26. This type of VFG may be particularly well suited for aircraft applications.

Figure 2:
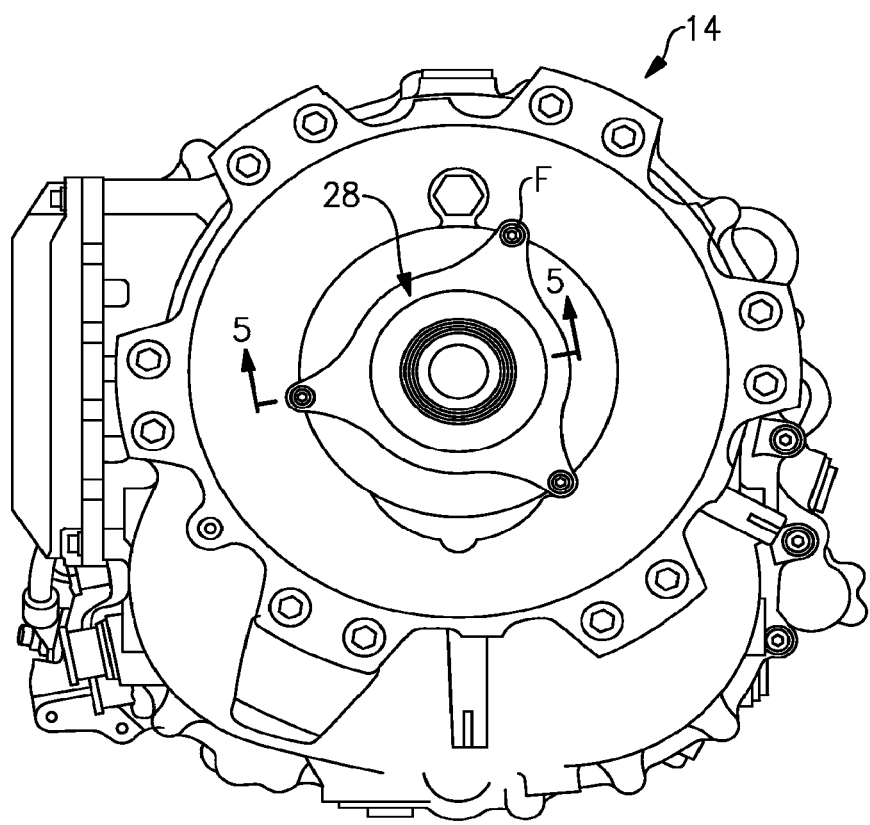
FIG. 2 is a front view of the starter-generator with a seal cartridge according to the disclosure.
Figure 3:
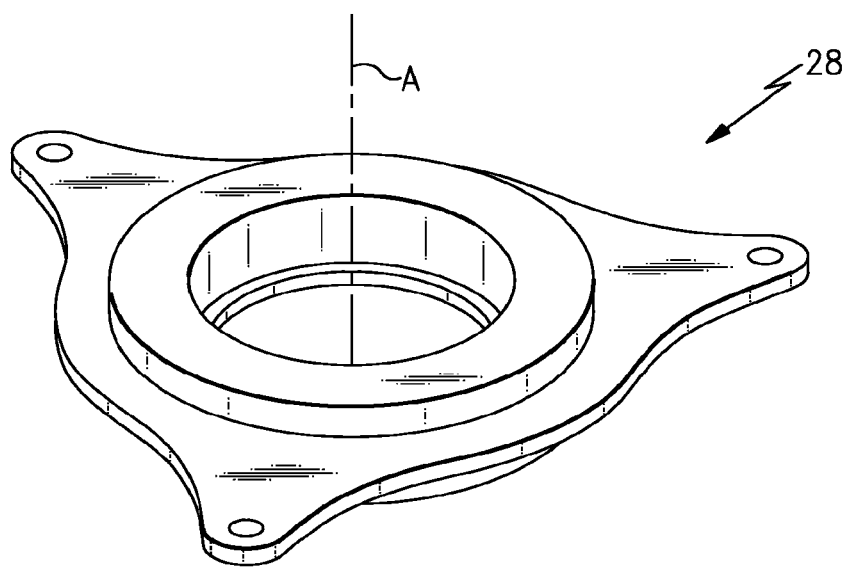
FIG. 3 is a perspective view of the seal cartridge.

A seal cartridge 28 (FIG. 2) is mounted to the generator 14 to provide a rotational seal for the shaft 26 which interconnects the accessory gearbox 12 and the generator 14. The seal cartridge 28 is removably mounted on the generator 14 with fasteners F to facilitate replacement (FIG. 3).

Figure 4:
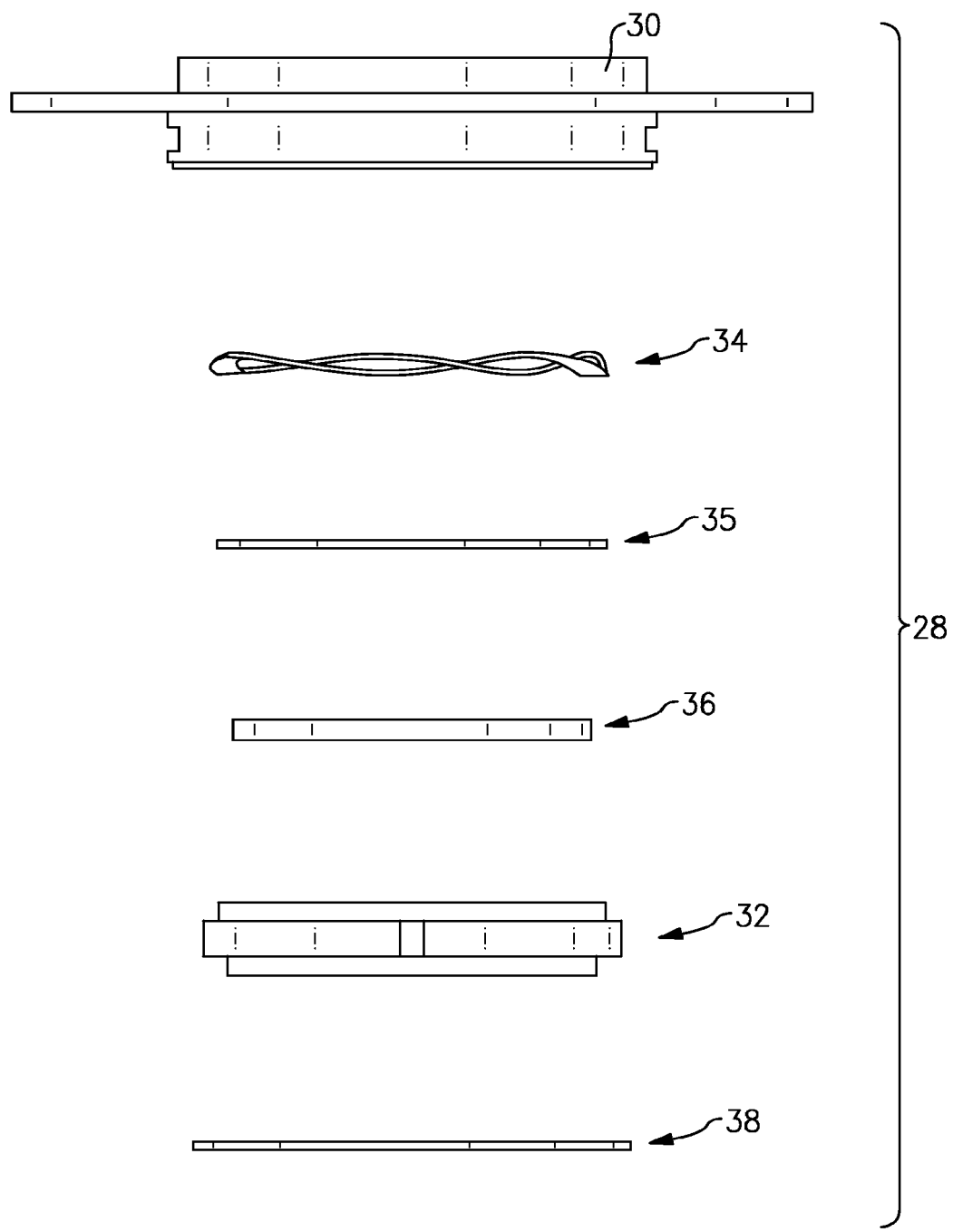
FIG. 4 is an exploded view of the seal cartridge.
Figure 5A:
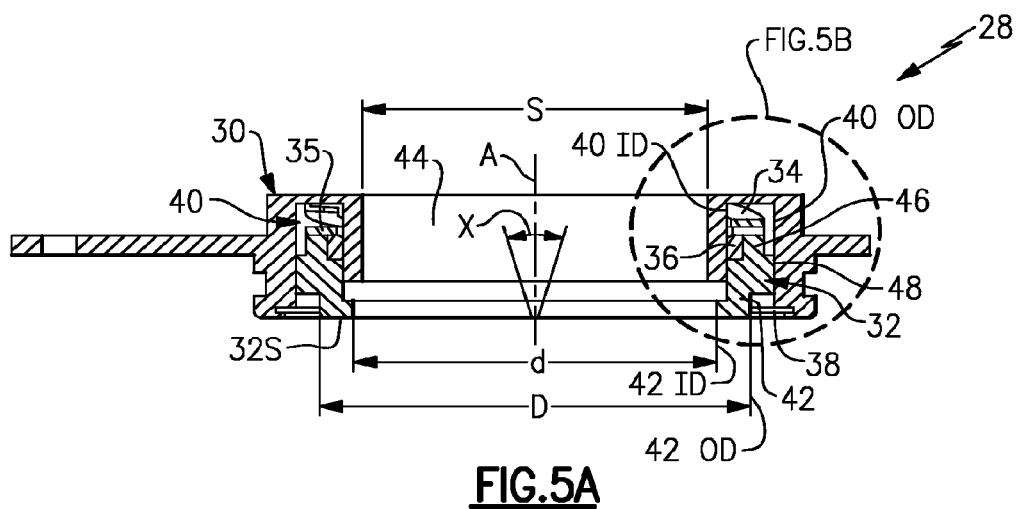
FIG. 5A is a sectional view of the seal cartridge taken along line 5-5 in FIG. 2.
Figure 5B:
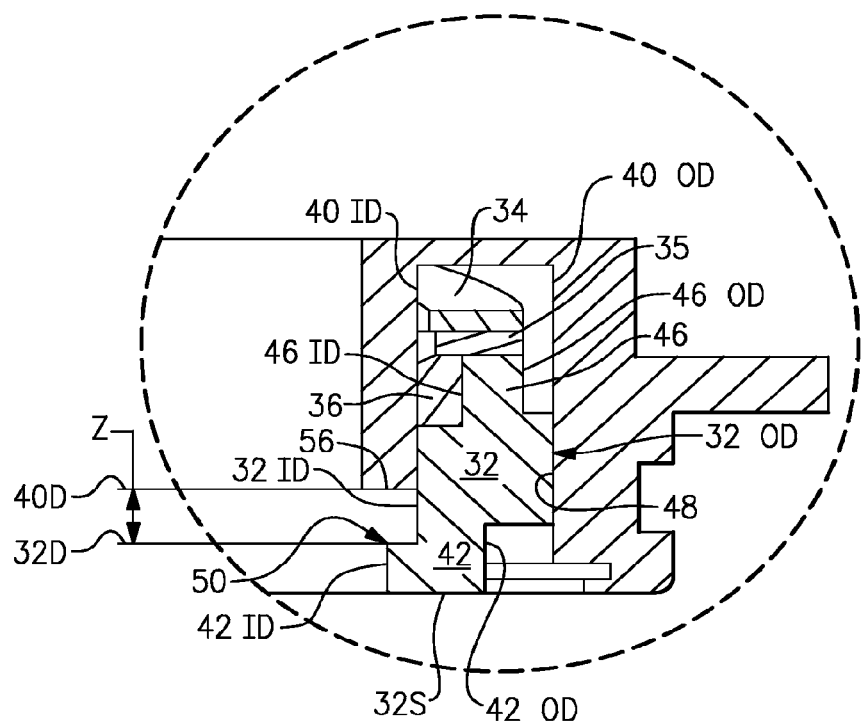
FIG. 5B is a expanded view of a portion of FIG. 5A.

Referring to FIG. 4, the seal cartridge 28 generally includes a housing 30, a seal ring 32, an axial load spring 34, a washer 35, an O-ring 36 and a retaining ring 38. The seal ring 32, the axial load spring 34, the washer 35 and the O-ring 36 are mounted within an annular cavity 40 which defines a cavity inner diameter 40ID and a cavity outer diameter 40OD which surrounds a shaft opening 44 defined by the housing 30 (FIGS. 5A and 5B). The ring 32, the axial load spring 34, the washer 35 and the O-ring 36 are often provided together as a kit which facilities repair of the seal cartridge 28.

Figure 6:
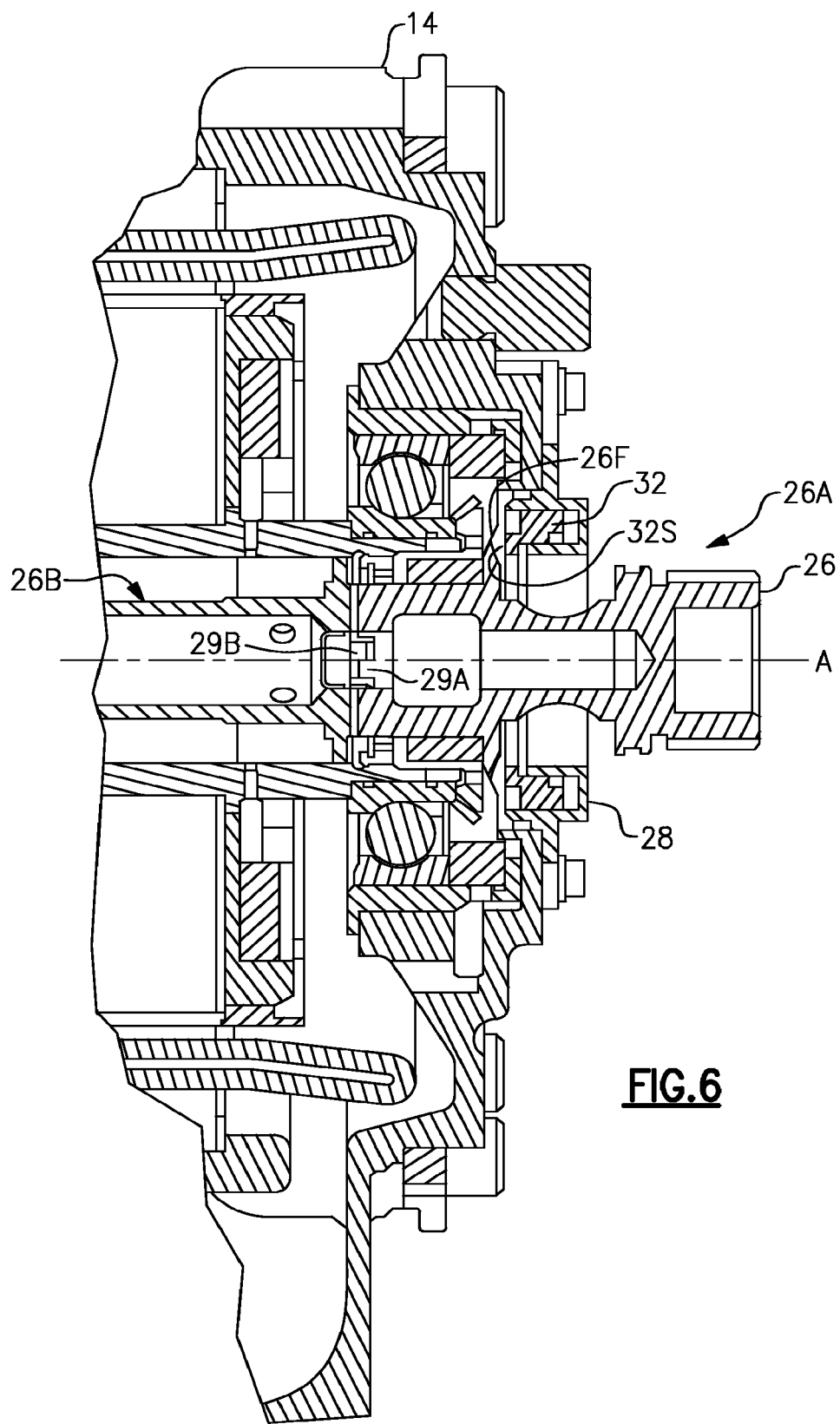
FIG. 6 is a sectional view of the starter-generator.

Referring to FIGS. 5A and 5B, the seal ring 32 includes a seal surface 32S defined by a seal ring nose 42. The seal surface 32S provides the interface for rotation of a shaft flange 26F of a shaft portion 26A (FIG. 6) which rotates thereon while the seal ring 32 is maintained in a rotationally stationary position. The seal ring 32 in the disclosed non-limiting embodiment may be manufactured of METCAR, the trade name for a family of solid, oil-free, self-lubricating materials manufactured by Metallized Carbon Corporation of Ossining, N.Y. USA.

Figure 7:
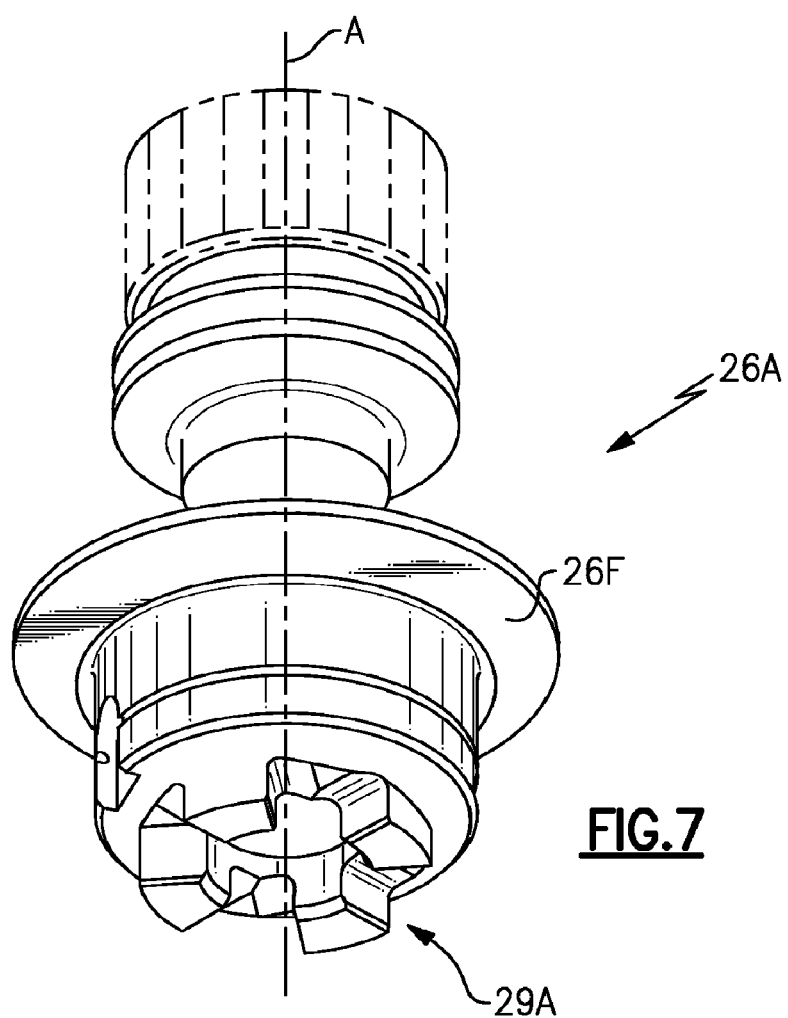
FIG. 7 is an isometric view of an input shaft portion which engages the seal cartridge.

The shaft 26 may be disconnected through an axial separation between shaft portions 26A and 26B with a disconnect clutch D (illustrated somewhat schematically in FIGS. 1 and 6) which separates mating axial teeth 29A, 29B (FIG. 7). When the shaft 26 is mechanically decoupled at the disconnect clutch D (illustrated somewhat schematically at FIGS. 1 and 6, Applicant determined that the shaft portion 26A may move axially in a rapid manner which generates a shock load. The rapid motion is imparted to the seal cartridge 28 which may have heretofore caused the seal ring to bind or bottom out on other seal cartridge hardware. This may impart undesirable loads into the seal ring which may cause the seal ring nose to fracture. The seal cartridge 28 and the features disclosed herein minimize stress on the seal ring 32 to thereby reduce or eliminate the shock load effects associated with the disconnect event.

The axial load spring 34 biases the washer 35 and the seal ring 32 along an axis A defined by the shaft opening 44. In the disclosed non-limiting embodiment, the shaft opening 44 defines a diameter dimension S of 2.0 inches (50 mm).

A seal ring tail 46 defined by a seal ring tail inner diameter 46ID and a seal ring tail outer diameter 46OD. The seal ring tail inner diameter 46ID traps the O-ring 36 between the seal ring tail 46 and the cavity inner diameter 40ID. The axial load spring 34 biases the washer 35 onto the seal ring tail 46 to trap the O-ring 36 therein. The retaining ring 38 is mounted adjacent to the cavity 40 to assure the seal ring 32 is retained within the cavity 40 and thereby maintain the seal cartridge 28 as a single unit when removed from the generator 14.

A seal ring outer diameter 32OD includes a seal ring outer diameter stepped surface 48 which is located adjacent the cavity outer diameter 40OD. The seal ring outer diameter 32OD to the cavity inner diameter 40ID clearance is controlled to cause contact on the seal ring outer diameter 32OD such that the seal ring inner diameter 32ID will not contact the cavity inner diameter 40ID. A seal ring outer diameter stepped surface 48 and the clearance permit an angle X of, in the disclosed non-limiting embodiment, 1.9 degrees of misalignment within the cavity 40. That is, if the seal ring 32 is tilted or moved off the centerline A, the seal ring outer diameter 32OD will contact the cavity outer diameter 40OD while the seal ring inner diameter 32ID will not contact the cavity inner diameter 40ID. This prevents tensile loading on the seal ring 32 which would otherwise be caused by binding on the seal ring inner diameter 32ID. Such contact increases longevity as the seal ring 32 is generally stronger in compression than tension.

The seal ring nose 42 further defines a seal ring inner diameter stepped surface 50 which extends radially inward of the cavity inner diameter 40ID but less than dimension S to define as extended seal surface 32S. The seal surface 32S is manufactured to be free of scratches and chips. The seal ring nose 42 and thus the seal surface 32S are defined by a seal ring nose inner diameter 42ID and a seal ring nose outer diameter 42OD to provide a significant cross-section which significantly reduces stress risers. Cross-sections 32OD to 32ID, 46ID to 46OD, and 46ID to slot 52 are significant. Slot 52 is also sized to prevent machining marks on 46OD. The blends (radii) between all of these features significantly reduce stress risers.

In one non-limiting dimension embodiment, the seal ring nose inner diameter 42ID dimension is between 2.0 and 2.2 inches (51-56 mm) in diameter and the seal ring nose outer diameter 42OD dimension is between 2.3 and 2.7 inches (58-69 mm) in diameter. In the non-limiting dimension embodiment, the ratio between the seal ring nose outer diameter dimension D and the seal ring nose inner diameter dimension d is between 1.1:1 and 1.5:1.

A dimension Z between the depth 32D of the seal ring 32 and the depth 40D of the cavity 40 are defined to prevent the seal ring 32 from bottoming on anything other than the axial load spring 34. In one non-limiting dimension embodiment, a depth dimension Z is 0.03 inches (0.762 mm) minimum between the seal ring nose 42 and an outer housing face 56.

Figure 8:
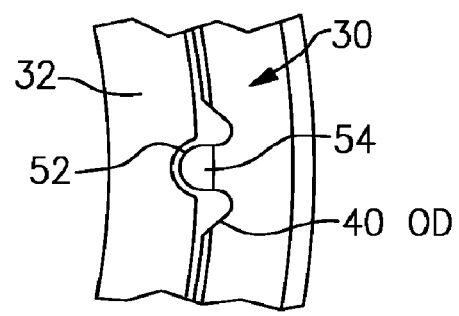
FIG. 8 is a front view of a seal ring illustrating an anti-rotation slot.

Referring to FIG. 8, the seal ring 32 defines a multiple of anti-rotation slots 52 which interface with radiused tabs 54 which extend inward from the cavity outer diameter 40OD. In the disclosed, non-limiting embodiment, four anti-rotation slots 52 are equally disposed about the perimeter of seal ring 32. It should be understood that any number of anti-rotation slots 52 may alternatively be provided.

The anti-rotation slots 52 define a full radius to reduce stress risers. The anti-rotation slots 52 are finished to a smooth surface finish such that the surface is free of chips. That is, the anti-rotation slots 52 define a smooth surface finish in the seal ring 32 to reduce stress risers. The anti-rotation slots 52 are also of a length to allow the seal ring 32 to move with the input shaft flange 26F during a disconnect event to prevent binding and stress. The anti-rotation slots 52 also reduce the weight of the seal ring 32 to further reduce shock loads.

Extensive testing has proved out the robustness of seal ring 32.

It should be appreciated that the seal cartridge 28 of the present application is not limited to use in conjunction with a specific type of rotating machine. Thus, although the present application is, for convenience of explanation, depicted and described as being implemented in a starter-generator, it should be appreciated that it can be implemented in numerous other machines including, but not limited to, a gas turbine engine, an auxiliary power unit, a turbo charger, a super charger, an air cycle machine, an alternator, an electric motor, an electric generator, an integrated constant speed drive generator and gearboxes of various types.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal cartridge for a generator comprising:
a housing which defines an annular cavity;
an axial load spring within said annular cavity; and
a seal ring within said annular cavity, said seal ring biased by said axial load spring.

2. The seal cartridge as recited in claim 1, wherein said seal ring includes a seal ring nose which defines a seal ring nose inner diameter which extends radially inward of an annular cavity inner diameter of said annular cavity and a seal ring nose outer diameter spaced away from an annular cavity outer diameter of said annular cavity to define a seal surface and a seal ring outer diameter.

3. The seal cartridge as recited in claim 2, wherein said seal ring nose inner diameter and said seal ring nose outer diameter defines a ratio between said seal ring nose outer diameter and said seal ring nose inner diameter is between 1.1:1 and 1.5:1.

4. The seal cartridge as recited in claim 1, wherein said seal ring includes a seal ring nose which defines a seal ring nose inner diameter and a seal ring nose outer diameter, a ratio between said seal ring nose outer diameter and said seal ring nose inner diameter is between 1.1:1 and 1.5:1.

5. The seal cartridge as recited in claim 1, wherein said seal ring includes a seal ring outer diameter that defines a seal ring outer diameter stepped surface located adjacent an annular cavity outer diameter.

6. The seal cartridge as recited in claim 5, wherein said seal ring outer diameter stepped surface to a cavity inner diameter is clearance controlled to cause contact on said seal ring outer diameter with said annular cavity outer diameter before said seal ring inner diameter will contact said annular cavity inner diameter.

7. The seal cartridge as recited in claim 6, wherein said seal ring outer diameter stepped surface is sized to provide a permitted misalignment.

8. The seal cartridge as recited in claim 7, wherein said permitted predefined misalignment is approximately 2 degrees within said annular cavity.

9. The seal cartridge as recited in claim 5, wherein said seal ring outer diameter stepped surface to a cavity inner diameter is clearance controlled to cause contact only on said seal ring outer diameter with said annular cavity outer diameter.

10. The seal cartridge as recited in claim 1, wherein said seal ring defines a multiple of anti-rotation slots which interface with a respective multiple of tabs which extend inward from said annular cavity outer diameter, said multiple of anti-rotation slots each define a full radius.

11. The seal cartridge as recited in claim 1, further comprising an O-ring located between an inner diameter of said annular cavity, said seal ring and said axial load spring.

12. A seal kit for a seal cartridge having a housing which defines an annular cavity comprising:
an axial load spring which is insertable within the annular cavity;
a seal ring which is insertable within the annular cavity to bias said seal ring by said axial load spring; and
a retaining ring mountable adjacent to the annular cavity to retain said seal ring within the annular cavity against the bias of said axial load spring.

13. The seal kit as recited in claim 12, further comprising an O-ring locatable between an inner diameter of the annular cavity, said seal ring and said axial load spring.

14. The seal kit as recited in claim 12, further comprising a washer locatable between said seal ring and said axial load spring.

15. A generator comprising:
a main rotor which defines an axis of rotation;
an input shaft which extends from said main rotor along said axis of rotation;
a disconnect clutch selectively operable to axially separate a first shaft portion from a second shaft portion of said input shaft along said axis of rotation, said first shaft portion defines a shaft flange;
a seal cartridge comprising:
a housing which defines an annular cavity;
an axial load spring within said annular cavity;
a seal ring within said annular cavity, said seal ring biased by said axial load spring into contact with said shaft flange.

16. The generator as recited in claim 15, wherein said seal ring includes a seal ring nose which defines a seal ring nose inner diameter which extends radially inward of an annular cavity inner diameter of said annular cavity and a seal ring nose outer diameter spaced away from an annular cavity outer diameter of said annular cavity to define a seal surface and a seal ring outer diameter.

17. The generator as recited in claim 16, wherein said seal ring nose inner diameter and said seal ring nose outer diameter defines a ratio between said seal ring nose outer diameter and said seal ring nose inner diameter is between 1.1:1 and 1.5:1.

18. A method of sealing an input shaft of a generator comprising:
inserting a seal cartridge at least partially into a generator component such that a seal ring within an annular cavity of the seal cartridge is biased into contact with a shaft flange of an input shaft to the generator component; and
securing the seal cartridge to the generator with at least one fastener.

19. A method as recited in claim 18, wherein the seal ring is retained within the annular cavity to prevent the seal ring from bottoming out within the annular cavity.

20. A method as recited in claim 18, further comprises:
retaining the seal ring within the annular cavity with a retaining ring such that the seal cartridge is a single unit during the inserting step.

21. A method as recited in claim 18, further comprises:
sizing a seal ring outer diameter stepped surface to an annular cavity inner diameter to cause contact on the seal ring outer diameter with the annular cavity outer diameter before the seal ring inner diameter will contact the annular cavity inner diameter.

\* \* \* \* \*